United States Patent [19]

Matsuyama

[11] Patent Number: 5,753,912
[45] Date of Patent: May 19, 1998

[54] CANTILEVER CHIP

[75] Inventor: Katsuhiro Matsuyama, Hachioji, Japan

[73] Assignee: Olympus Optical Co., Ltd., Tokyo, Japan

[21] Appl. No.: 811,227

[22] Filed: Mar. 3, 1997

[30] Foreign Application Priority Data

Mar. 12, 1996 [JP] Japan ............................. 8-054799

[51] Int. Cl.$^6$ ........................................... H01J 37/28
[52] U.S. Cl. ................................. 250/306; 73/105
[58] Field of Search ........................ 250/306; 73/105

[56] References Cited

U.S. PATENT DOCUMENTS

| Re. 33,387 | 10/1990 | Binnig | 250/306 |
|---|---|---|---|
| 5,021,364 | 6/1991 | Akamine et al. | 250/306 |
| 5,051,379 | 9/1991 | Bayer et al. | 437/225 |
| 5,239,863 | 8/1993 | Kado et al. | 73/105 |
| 5,367,165 | 11/1994 | Toda et al. | 250/306 |

FOREIGN PATENT DOCUMENTS

WO 92/12398  7/1992  WIPO

OTHER PUBLICATIONS

S. Akamine et al; "Improved Atomic Force Microscope Images Using Microcantilevers With Sharp Tips"; pp. 316–318; Appl. Phys. Lett. 57 (3); Jul. 16, 1990.

T.R. Albrecht et al; "Microfabrication of Cantilever Styli for the Atomic Force Microscope"; pp. 3386–3396; J. Vac. Sci. Technol. A8 (4); Jul./Aug., 1990.

T.R. Albrecht et al; "Atomic Resolution Imaging of a Nonconductor By Atomic Force Microscopy"; pp. 2599–2602; J. Appl. Phys. 62 (7), Oct. 1, 1987.

Primary Examiner—Jack I. Berman
Attorney, Agent, or Firm—Frishauf, Holtz, Goodman, Langer & Chick

[57] ABSTRACT

A cantilever chip comprises a support section having a support face and an attachment face opposed to the support face, a cantilever supported on the support face of the support section, and a probe provided on a free-end portion of the cantilever. The width of the support face of the support section is less than the width of the attachment face such that a pointed end portion of the probe may scan a desired portion of a sample without influence due to the shape of a surface of the sample. First and second inclined faces extending in the longitudinal direction of the cantilever are formed between the support face and the attachment face.

8 Claims, 6 Drawing Sheets

CANTILEVER CHIP

BACKGROUND OF THE INVENTION

The present invention relates to a cantilever chip for use in a scanning probe microscope such as a scanning tunneling microscope (STM) or an atomic force microscope (AFM). In this specification, the term "cantilever chip" has a generic concept indicating a combination of a cantilever and a support for the cantilever.

A scanning probe microscope (SPM) is conventionally known as an apparatus for observing a sample with a resolution of an atomic order.

As an example of the SPM, a scanning tunneling microscope (STM) was invented by Binnig, Rohrer, et al. In the STM, however, a sample to be observed is limited to an electrically conductive one. To solve this problem, an atomic force microscope (AFM) was proposed as an apparatus capable of observing an insulating sample with a resolution of an atomic order with use of elemental techniques of STM, e.g. servo technique (see U.S. Pat. No. Re. 33,387).

The structure of the AFM is similar to that of the STM, and the AFM can be regarded as one type of the scanning probe microscope (SPM). The AFM includes a probe having a pointed projection or a probe at its free end. If the probe is approached to a sample, the free-end portion of the probe is displaced due to an interactive force (inter-atomic force) acting between an atom at the pointed end of the probe and an atom on the surface of the sample. The probe is scanned in X- and Y-directions along the surface of the sample while the variation in vibration amplitude of the free-end portion of the probe is measured electrically or optically. Thus, data on irregularity on the sample is obtained three-dimensionally.

Albrecht, et al. proposed, as a cantilever chip for SPM measurement, a silicon-dioxide cantilever chip fabricated by application of a semiconductor IC process, and this cantilever chip can be fabricated with very high reproducibility of an micrometer (μm) order (see Thomas R. Albrecht, Calvin F. Quate: Atomic Resolution Imaging of a Nonconductor by Atomic Force Microscopy, J. Appl. Phys. 62(7), 1 Oct. 1987, pp 2599–2602. In addition, such cantilever chips can be mass-produced by a batch process, and the manufacturing cost can be reduced. At present, accordingly, cantilever chips are manufactured principally by a method using a semiconductor IC process.

For example, there is known a cantilever in which a silicon nitride film is replaced with a silicon dioxide film, as disclosed in J. Vac. Sci. Technol. A8(4), Jul/Aug 1990, pp 3386–3396: T. Albrecht, S. Akamine, T. E. Caver and C. F. Quate. The size of the cantilever of the cantilever chip is: the length=about 50 to 200 μm, and the thickness=about 0.5 to 1 μm. The shape of the cantilever is triangular (with a hole) or rectangular.

For example, Appln. Phys. Lett. 57(3), 16 Jul. 1990, pp 316–318: S. Akamine, R. C. Barrett and C. F. Quate discloses a conical probe formed of single-crystal silicon. This probe is formed by anisotropic wet etching through use of KOH aqueous solution, etc. A pointed end portion of the probe is formed such that three ridge lines intersect at one point. Thus, a sharply pointed probe with a stable structure can be provided theoretically.

In addition, U.S. Pat. No. 5,051,379 (T. Bayer, et al.), for example, discloses a cantilever chip formed entirely of single-crystal silicon.

Moreover, M. Tortonese, et al. propose an integrated AFM sensor wherein a cantilever itself is provided with a function for measuring a displacement of the cantilever. The integrated AFM sensor is disclosed, for example, in "M. Tortonese, H. Yamada, R. C. Barrett and C. F. Quate: Transducers and Sensors '91: Atomic force microscopy using a piezoresistive cantilever" or PCT Application WO 92/12398, and a theory of measurement using a piezoresistive effect is applied to this integrated AFM sensor.

In the meantime, in a conventional cantilever chip, the width of a side face (hereinafter referred to as "support face") of a cantilever support, on which side face a cantilever is mounted is greater than the width of the cantilever by several tens of times. In addition, in the conventional cantilever chip, the ratio of the height of the probe to the width of the support face is 1:100. Thus, the height of the probe is ignorably small and the probe is viewed to be substantially flat, when the probe is observed in the longitudinal direction of the cantilever.

Consequently, when the surface of a sample is subjected to SPM measurement by using the conventional cantilever chip, the support face of the support may first come into contact with the surface of the sample before the tip of the probe comes into contact with the surface of the sample, in particular, at a location where the surface of the sample is deeply recessed. As a result, the SPM measurement may fail.

BRIEF SUMMARY OF THE INVENTION

The present invention has been made in order to solve the above problem, and its object is to provide a cantilever chip enabling a pointed end portion of a probe to smoothly and exactly scan a desired portion of a sample without influence due to the shape of the surface of the sample.

In order to achieve the above object, there is provided a cantilever chip comprising:

a support section having a support face and an attachment face opposed to the support face;

a cantilever supported on the support face of the support section; and a probe provided on a free-end portion of the cantilever, wherein the width of the support face of the support section is less than the width of the attachment face such that a pointed end portion of the probe may scan a desired portion of a sample without influence due to the shape of a surface of the sample.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiment given below, serve to explain the principles of the invention.

DETAILED DESCRIPTION OF THE INVENTION

A cantilever chip according to a first embodiment of the present invention will now be described with reference to FIGS. 1A to 1C, 2A to 2H and 3A to 3C.

Figure 1A:
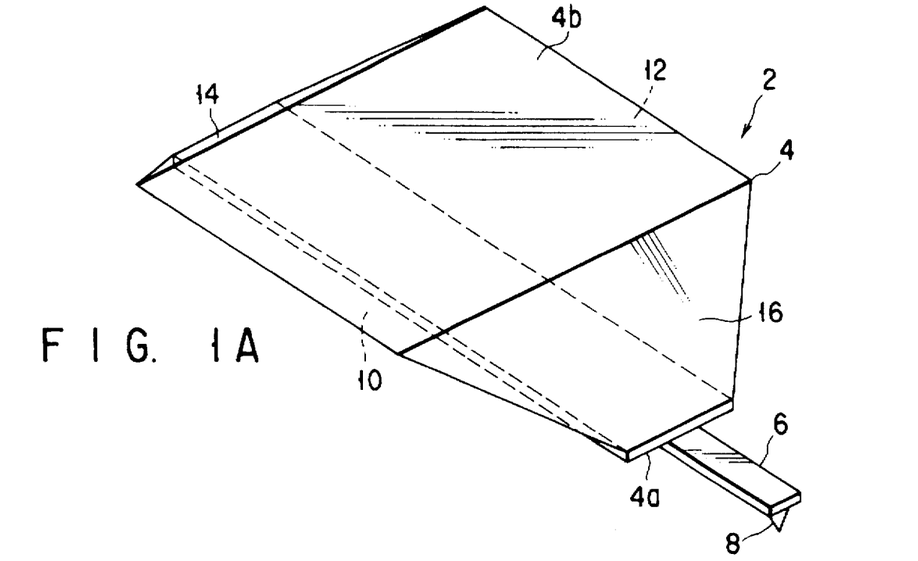
FIG. 1A is a perspective view of a cantilever chip according to a first embodiment of the present invention.

As is shown in FIG. 1A, a cantilever chip 2 according to the first embodiment comprises a support section 4 with a support face 4a and an attachment face 4b opposed to the support face 4a, a cantilever 6 supported on the support face 4a of support section 4, and a probe 8 provided on a free-end portion of the cantilever 6. The width of the support face 4a of support section 4 is set to be less than that of the attachment face 4b so that the probe 8 may scan a desired measurement portion with no influence due to the shape of the surface of a sample 18 (see FIG. 3A).

The support section 4 is formed of silicon material so as to have the support face 4a and attachment face 4b with (100) planes and first to fourth inclined faces 10, 12, 14 and 16 with (111) planes.

Figure 1B:
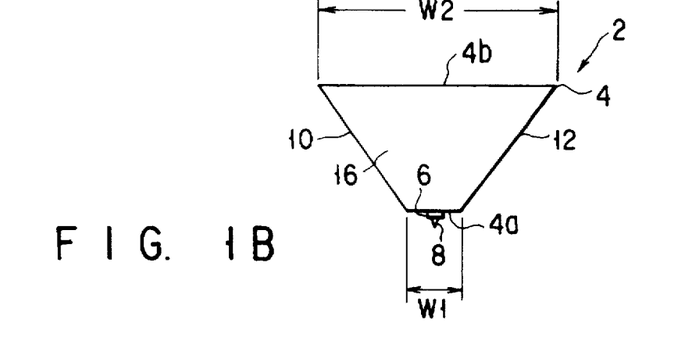
FIG. 1B is a front view of the cantilever chip shown in FIG. 1A.

As is shown in FIG. 1B, the width W1 of the support face 4a is set to be less than the width W2 of the attachment face 4b for attachment of the cantilever chip on an SPM apparatus (not shown). The first and second inclined faces 10 and 12 extending in the longitudinal direction of the cantilever 6 are exposed between the support face 4a and attachment face 4b.

Figure 1C:
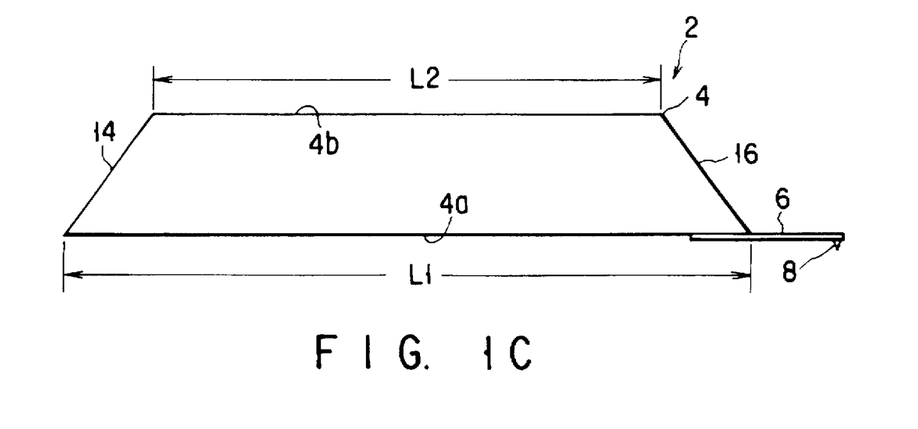
FIG. 1C is a side view of the cantilever chip shown in 1A.

The length L1 of the support face 4a, as shown in FIG. 1C, is greater than the length L2 of the attachment face 4b. The third and fourth inclined faces 14 and 16 extending in a direction perpendicular to the longitudinal axis of the cantilever 6 are exposed between the support face 4a and attachment face 4b.

Figure 3A:
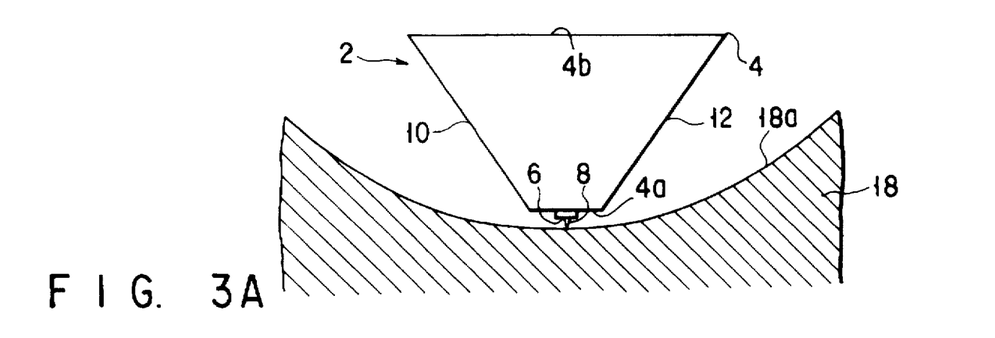
FIG. 3A shows the state in which SPM measurement of the surface of a sample is performed by using the cantilever chip according to the first embodiment of the invention.

According to the cantilever chip 2 of this embodiment, the first and second inclined faces 10 and 12 are formed so that the width of the support section 4 decreases towards a sample surface 18a (see FIG. 3A). Thus, even if the sample surface 18a with, e.g. a concave shape is SPM-measured by using the cantilever chip 2, the support face 4a does not come into contact with the concaved sample surface 18a and only the tip portion of the probe 8 is put in smooth and sure contact with the sample surface 18a.

Figure 7A:
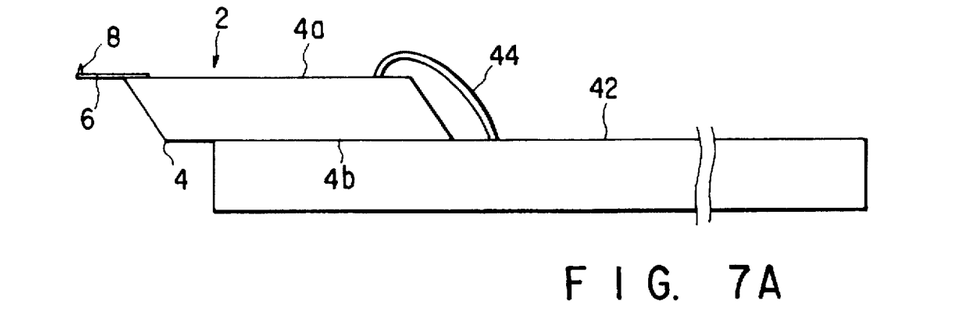
FIG. 7A shows a cantilever chip according to fourth embodiment of the invention, in the state in which the cantilever chip with the shape shown in FIGS. 3B and 3C is mounted on a substrate.
Figure 7B:
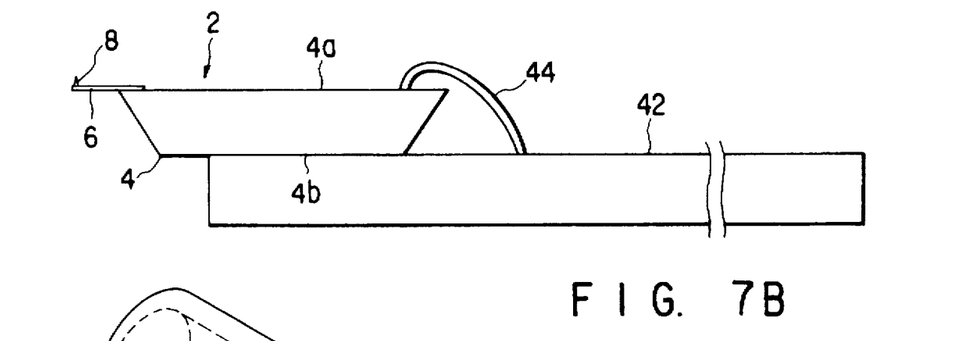
FIG. 7B is a side view showing a cantilever chip with the shape shown in FIG. 1A is mounted on a substrate.

According to the cantilever chip 2 of this embodiment, the size of the attachment face 4b is greater than that of the support face 4a. Thus, the cantilever chip 2 can be attached to a cantilever holder such as a base plate 42, as shown in FIGS. 7A and 7B, with higher stability. Furthermore, since the size of the attachment face 4b is greater than that of the support face 4a, the cantilever chip 2 can be stably placed on a stated mount base, such as table (not shown).

A process of fabricating the cantilever chip 2 according to the first embodiment will now be described with reference to FIGS. 2A to 2H.

Figure 2A:
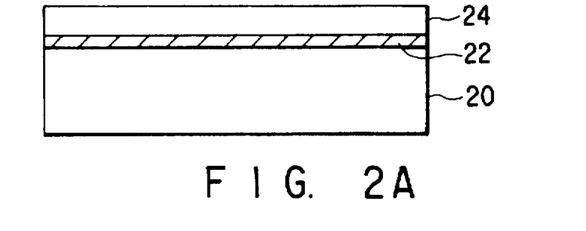
FIGS. 2A to 2H are views illustrating the steps of a process of fabricating the cantilever chip according to the first embodiment of the invention.

At first, an attachment-type SOI (silicon on insulator) substrate is prepared as a starting wafer material, as shown in FIG. 2A (first step). The SOI substrate comprises a silicon substrate 20 with <100> plane, a silicon oxide film 22 formed on the surface of the silicon substrate 20, and a silicon substrate 24 with <100> plane attached on the silicon substrate 22 as a layer which will become an active layer.

Figure 2B:
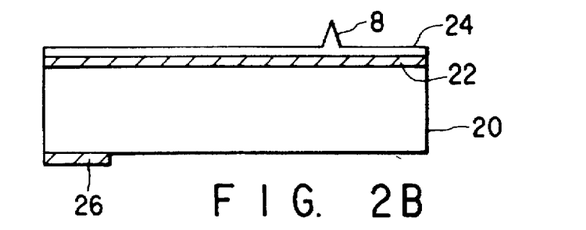

As is shown in FIG. 2B, a mask 26 such as an silicon oxide film or a silicon nitride film, which will be used as an etching mask in forming the support section 4 (see FIG. 1A), is formed on the bottom surface of the silicon substrate 20, and a predetermined portion of the active layer (silicon substrate) 24 is etched so as to form the probe 8 (second step).

Figure 2C:
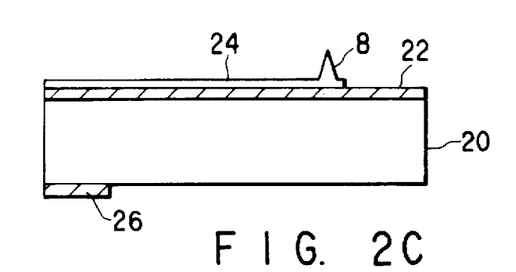

The surface of the active layer (silicon substrate) 24 is subjected to photolithography and etching, as shown in FIG. 2C, thereby forming the rectangular cantilever 6 (see FIG. 1A) (third step).

Figure 2D:
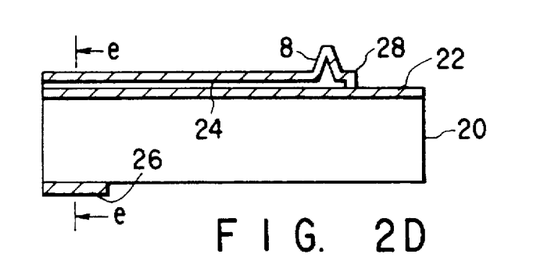
Figure 2E:
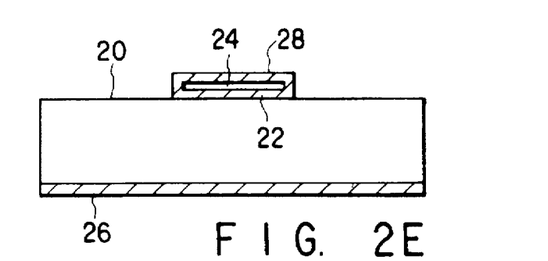

Subsequently, as shown in FIGS. 2D and 2E, using a thermal diffusion furnace (not shown), a silicon oxide film 28 is formed on the surface of the active layer (silicon substrate) 24 patterned in the form of the cantilever, and the silicon oxide film 28 is patterned by means of photolithography and etching to form a mask for forming the support section 4 (fourth step). The mask is formed of the active layer 24 and silicon oxide film 28. FIG. 2E is a cross-sectional view taken along line e—e in FIG. 2D.

Figure 2F:
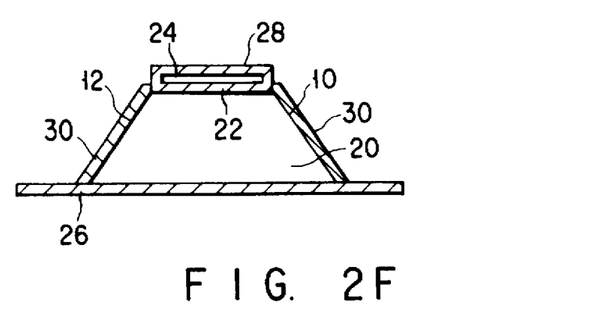

Using the mask patterned in the fourth step, the silicon substrate 20 is subjected to anisotropic wet etching, as shown in FIG. 2F, thereby forming the support section 4 (see FIG. 1A) extending in parallel to the longitudinal axis of the cantilever 6 (see FIG. 1A). In addition, a silicon oxide film 30 is formed on the exposed inclined faces 10 and 12 (i.e. the first and second inclined faces shown in FIG. 1A and 1B) of the silicon substrate 20 (fifth step). FIG. 2F shows the cantilever 6, as viewed in the same direction as in FIG. 2E.

Figure 2G:
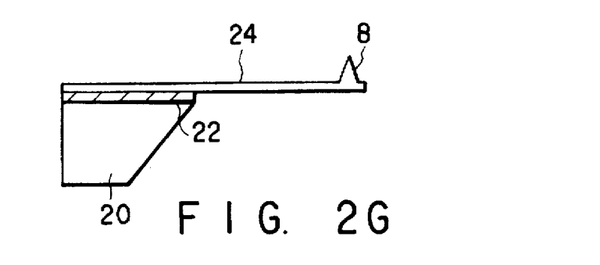
Figure 2H:
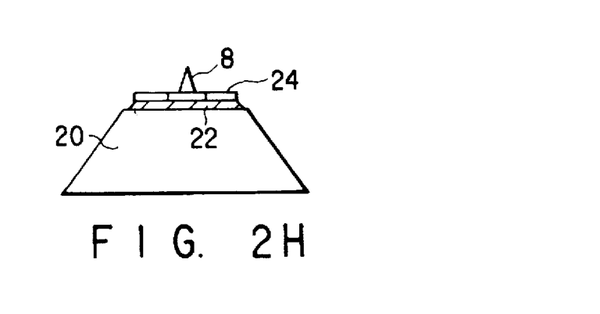

Then, using the mask 26, the silicon substrate 20 is subjected to anisotropic wet etching once again, as shown in FIGS. 2G and 2H, thereby forming the support section 4 (see FIG. 1A). Thereafter, the masks 22, 26, 28 and 30 of silicon oxide are removed through use of an aqueous solution of hydrogen fluoride (not shown), etc. (sixth step). FIG. 2H shows the cantilever 6 in its longitudinal direction.

The cantilever chip 2 of the first embodiment, as shown in FIG. 1A, is fabricated through the above-described process.

In the fabrication process of the first embodiment, the cantilever 6 has a rectangular shape. However, in the third step (FIG. 2C), a triangular cantilever 6 may be formed. In addition, in the sixth step (FIGS. 2G and 2H) the bottom surface of the cantilever 6, i.e. the surface opposite to the surface provided with the probe 8, may be coated with a metallic reflective film for SPM measurement.

According to this fabrication process, the support section 4 with the first and second inclined faces 10 and 12, which are formed such that the width of the support section 4 decreases towards the sample surface 18a, can be formed easily and precisely by performing the anisotropic wet etching only twice.

The present invention is not limited to the above embodiment. Various modifications can be made without involving new matter. For example, in the above embodiment, the cantilever chip 2 is fabricated by using the attachment-type silicon wafer. However, the attachment-type silicon wafer may be replaced with an ordinary silicon wafer.

Figures 3B, 3C:
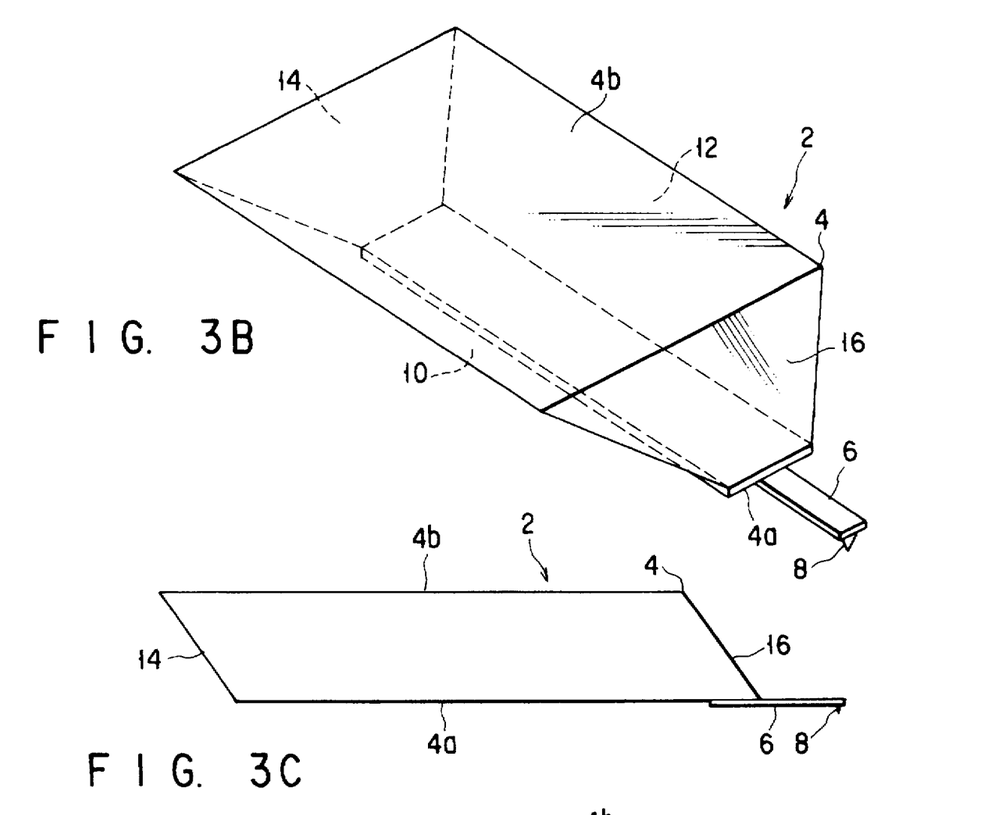
FIG. 3B is a perspective view showing a modification of the cantilever chip according to the first embodiment.
FIG. 3C is a side view of the cantilever chip shown in FIG. 3B.

FIGS. 3B and 3C show a modification of the cantilever chip 2, in which the third inclined face 14 of support section 4 is formed substantially in parallel to the fourth inclined face 16. In this case, too, the same advantage as in the first embodiment can be obtained.

Figure 3D:
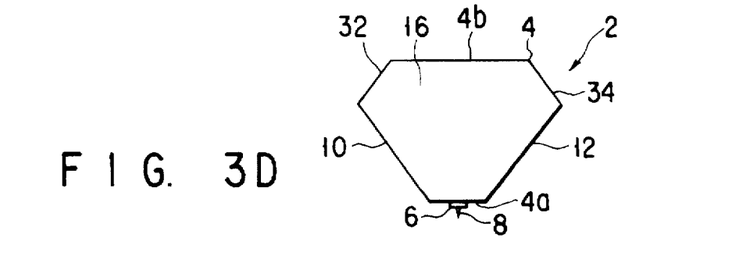
FIG. 3D is a front view of another modification of the cantilever chip according to the first embodiment.

FIG. 3D shows another modification of the cantilever chip 2. In this modification, fifth and sixth inclined faces 32 and 34 are formed to be continuous with the first and second inclined faces 10 and 12 so that the support section 4 may have a substantially hexagonal cross-sectional shape. In this case, too, the same advantage as in the first embodiment can be obtained.

A cantilever chip according to a second embodiment of the invention will now be described with reference to FIGS. 4A and 4B. In the second embodiment, the structural elements common to those of the first embodiment are denoted by like reference numerals and a description thereof is omitted. The cantilever chip of the second embodiment is fabricated by the same process as the cantilever chip of the first embodiment.

Figure 4A:
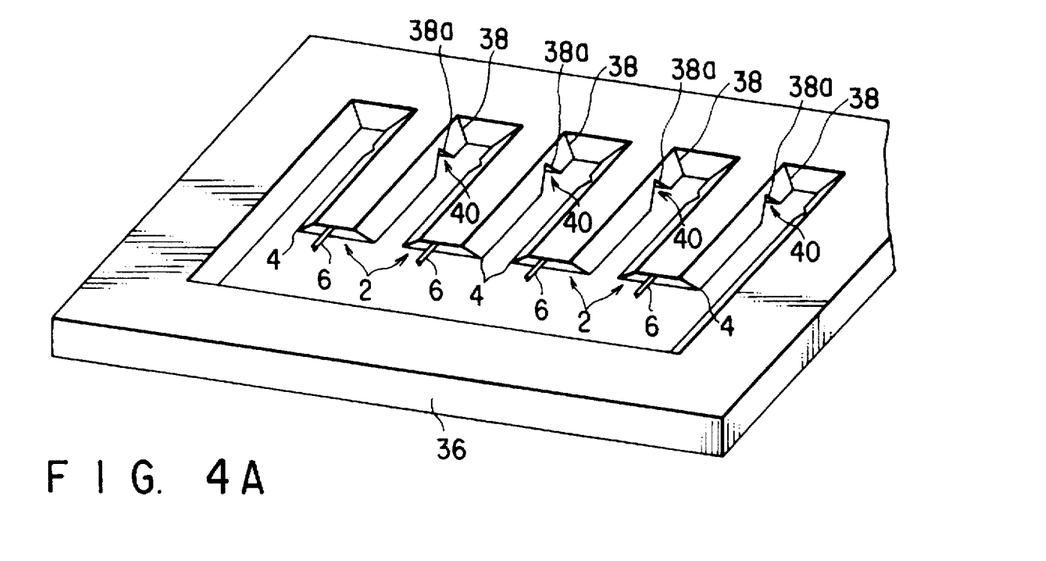
FIG. 4A is a perspective view showing the state in which cantilever chips according to a second embodiment of the invention are formed in parallel in a silicon frame.

FIG. 4A shows the state in which cantilever chips 2 each having the shape shown in FIGS. 1A to 1C are juxtaposed at an interval of about 1.6 mm in a frame 36 of silicon with a size of 10 mm×10 mm. In the second embodiment, for example, four cantilever chips 2 are juxtaposed in an array within the silicon frame 36.

As is shown in FIG. 4A, the four cantilever chips 2 are supported respectively by four coupling portions 38 formed on the silicon frame 36.

Each coupling portion 38 is provided with an inclined coupling face 38a having a (111) plane. A cantilever chip severing V-shaped groove 40 is defined by the inclined coupling face 38a and the third inclined face 14 of support section 4 (see FIG. 1A).

According to this structure, each cantilever chip 2 is supported at the V-shaped groove 40. Thus, each cantilever chip 2 can easily be severed from the silicon frame 36 only by pushing the cantilever chip 2 upward or downward.

Each of the cantilever chip severing V-shaped grooves 40 is located remotest from the associated cantilever 6. Thus, when the cantilever chip 2 is severed, it is hardly possible that broken portions of silicon hit the cantilever 6. As a result, it is possible to reduce the possibility of breakage of the cantilever 6 or probe 8 (see FIG. 1A) due to the broken portions of silicon.

In addition, according to the present embodiment, the arrayed cantilever chips 2 can be arranged in the silicon frame 36 at predetermined intervals. Thus, a defect occurring, for example, in one of the cantilever chips 2 does not affect the other cantilever chips 2. Therefore, the yield of cantilever chips can be increased.

In the second embodiment, the cantilever chips 2 having the shape shown in FIGS. 1A to 1C are used. Alternatively, cantilever chips 2 having the shape shown in FIGS. 3B and 3C can be juxtaposed in the silicon frame 36, as shown in FIG. 4B, with the same advantage obtained.

The support section 4 may have the following structure.

Figure 4B:
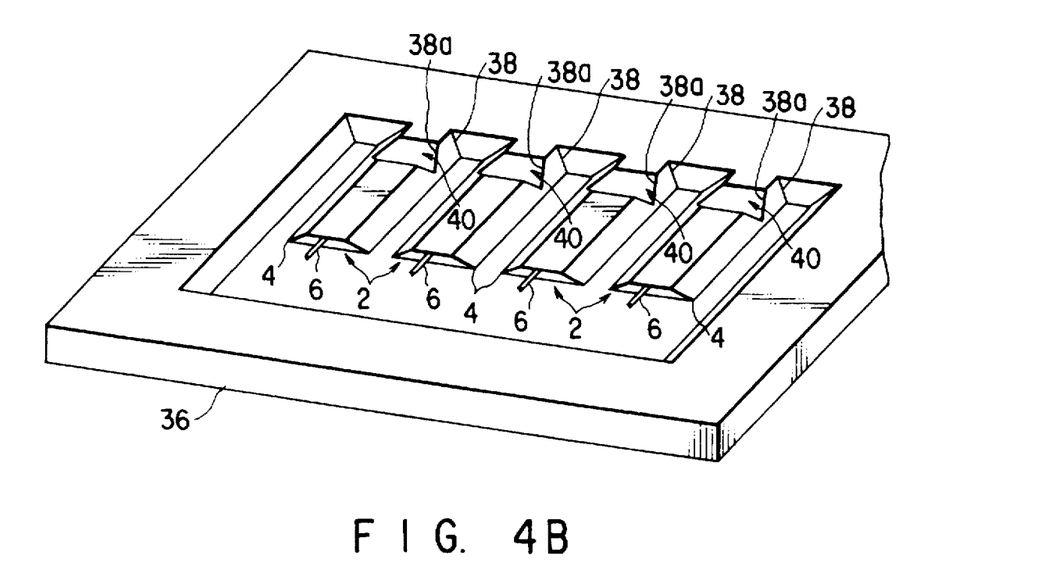
FIG. 4B is a perspective view showing the state in which cantilever chips according to a modification of the second embodiment of the invention are formed in parallel in a silicon frame.
Figure 5:
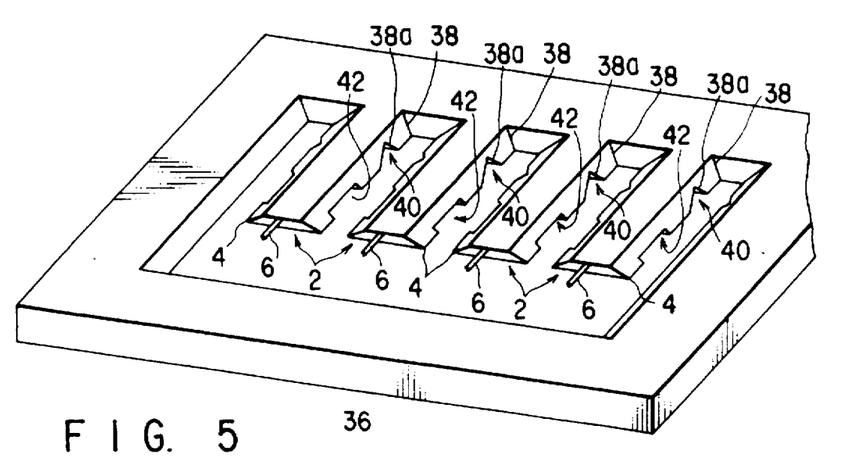
FIG. 5 is a perspective view showing the structure of cantilever chips according to a modification of the second embodiment shown in FIG. 4A.

FIG. 5 shows the state in which cantilever chips 2 are arrayed in the silicon frame 36 in the same manner as shown in FIGS. 4A and 4B.

Each cantilever chip 2 shown in FIG. 5 has the same structure as each cantilever chip 2 shown in FIGS. 4A and 4B, except the region of a cantilever chip hold groove 42. Accordingly, the structural parts common to those of the cantilever chip 2 shown in FIGS. 4A and 4B are denoted by like reference numerals, and a description thereof is omitted.

The cantilever chip hold groove 42 can be formed in a desired shape, by subjecting both side faces of the support section 4 to photolithography and etching. In the structure shown in FIG. 5, the cantilever chip hold groove 42 has a rectangular groove by way of example.

When the cantilever chip 2 is severed from the silicon frame 36, an edge portion of the support section 4 is generally held by means of forceps, etc. However, if the edge portion of the support section 4 is held by forceps, etc. to sever the cantilever chip 2, the operation for severing it from the silicon frame 36 becomes very unstable. Most of conventional cantilever chips are not provided with hold portions for stable severing operations by means of forceps.

If the support section 4 is provided with the cantilever chip hold groove 42, as shown in FIG. 5, the region of the groove 42 may be clamped by the forceps, etc. and the support section 4 can be surely held. Thus, the cantilever chip 2 can be severed from the silicon chip 36 very stably and easily. If the cantilever chip hold groove 42 is combined with the cantilever chip severing V-shaped groove 40, the severing operation can be performed more smoothly and efficiently.

The cantilever chip hold groove 42 can be easily formed by adding, for example, the following steps to the process illustrated in FIGS. 2A to 2H.

In the fabrication step illustrated in FIG. 2F, a portion of the silicon oxide film 30 is removed in a desired configuration by means of photolithography, thereby exposing a portion of the silicon substrate 20. The exposed portion of silicon substrate 20 is etched and recessed. The recessed portion becomes the cantilever chip hold groove 42. The subsequent steps are the same as the steps illustrated in FIGS. 2G and 2H.

The cantilever chip hold groove 42 may also be formed in the following process.

In the fabrication step illustrated in FIG. 2C, a portion of the mask 26 extending in the longitudinal direction of the cantilever chip 2 is removed in a desired configuration by means of photolithography, thereby exposing a portion of the silicon substrate 20. The exposed portion of silicon substrate 20 is etched and recessed. The recessed portion becomes the cantilever chip hold groove 42. The subsequent steps are the same as the steps illustrated in FIGS. 2D and 2H.

In FIGS. 4A, 4B and 5, four cantilever chips 2 are arranged in the silicon frame 36. The present invention, however, is not limited to this mode. The number of cantilever chips 2 formed in the silicon frame 36 may be properly chosen in accordance with the shape and size of each cantilever chip 2 and silicon substrate 20.

A cantilever chip according to a third embodiment of the invention will now be described with reference to FIGS. 6A and 6B. In the third embodiment, the structural parts common to those of the preceding embodiments are denoted by like reference numerals, and a description thereof is omitted. The cantilever chip of the third embodiment is fabricated by using the fabrication process described in connection with the first embodiment. The shape of the support section 4 of this cantilever chip (as viewed in the longitudinal direction of cantilever 6) is the same as that of the support section 4 of cantilever chip 2 shown in FIG. 1B (as viewed in the longitudinal direction of cantilever 6).

Figure 6A:
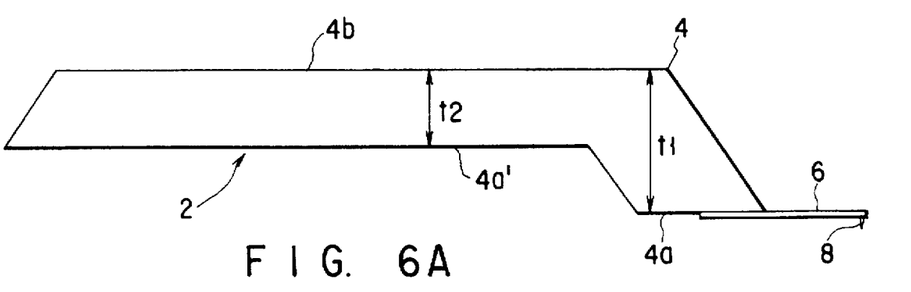
FIG. 6A is a side view showing a cantilever chip according to a third embodiment of the invention.

As is shown in FIG. 6A, that portion of the support section 4 of cantilever chip 2 of this embodiment, which is located remote from the cantilever 6 by a predetermined distance, is cut out. The thickness t2 of the portion between a cut-out face 4a' and the attachment face 4b is less than the thickness t1 of the portion between the support face 4a for cantilever 6 and the attachment face 4b.

In this embodiment, it should suffice if the support face 4a has an area enough to support a base end portion of the cantilever 6. Thus, the length in the longitudinal direction of the support face 4a is much less than that of the entire support section 4. For example, as compared to the support section 4 having a length of 3.7 mm, the length of the support face 4a is less than several-hundred μm.

Figure 6B:
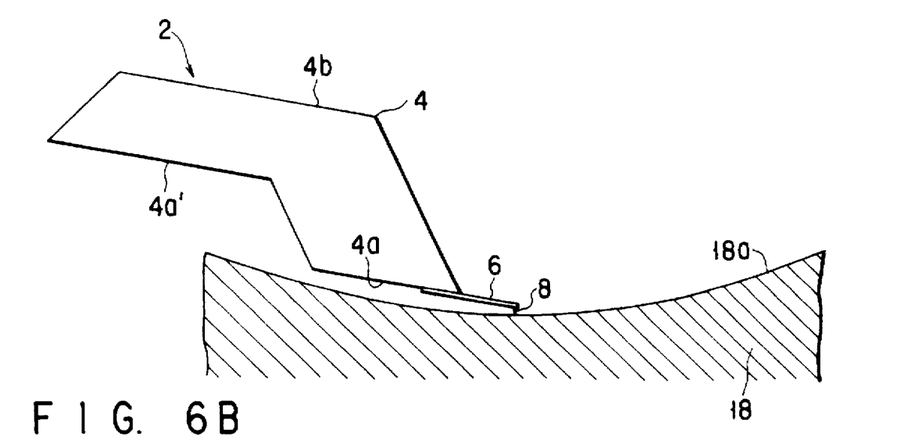
FIG. 6B shows the state in which SPM measurement of the surface of a sample is performed by using the cantilever chip according to the third embodiment of the invention.

According to this structure, for example, when the concaved sample surface 18a having a radius of curvature along the longitudinal axis of cantilever 6 is SPM-measured by means of the cantilever chip 2, as shown in FIG. 6B, only the pointed end portion of probe 8 can be smoothly and exactly scanned over the sample surface 18a, without putting the support face 4a in contact with the sample surface 18a.

In a modification of the cantilever chip 2 of this third embodiment, the support section with a substantially hexagonal cross section, as shown in FIG. 3D, may be used, and the same advantage as in the third embodiment can be obtained.

A cantilever chip according to a fourth embodiment of the invention will now be described with reference to FIGS. 7A to 7D. In the fourth embodiment, the structural parts common to those of the preceding embodiments are denoted by like reference numerals, and a description thereof is omitted. The cantilever chip of the fourth embodiment is fabricated by using the fabrication process described in connection with the first embodiment. The shape of the support section 4 of this cantilever chip (as viewed in the longitudinal direction of cantilever 6) is the same as that of the support section 4 of cantilever chip 2 shown in FIG. 1B (as viewed in the longitudinal direction of cantilever 6).

The cantilever chip 2 according to this embodiment is constructed such that a strain of the cantilever 6 due to an interactive force between the probe 8 and sample surface 18a (see FIGS. 3A and 6B) can be detected. The cantilever 6 is provided with a piezoresistive layer 48 (see FIG. 7D) which utilizes a piezoresistive effect of silicon material. For example, boron is injected in the piezoresistive layer 48, and the strain of the cantilever 6 is detected by measuring a variation in resistance value of the piezoresistive layer 48.

As is shown in FIGS. 7A and 7B, the cantilever chip 2 of this embodiment is attached to an SPM apparatus (not shown) by means of a base plate 42 of ceramic material, etc. having an electrode (not shown). Specifically, the attachment face 4b of support section 4 is mounted on the base plate 42, and an electrode 50 (see FIG. 7D) of the cantilever chip 2 is electrically connected to the electrode (not shown) of base plate 42 by means of an electrode wire 44. The electrode 50 is electrically connected to the piezoresistive layer 48 via a contact hole 52 formed in the cantilever 6.

Figures 7C, 7D:
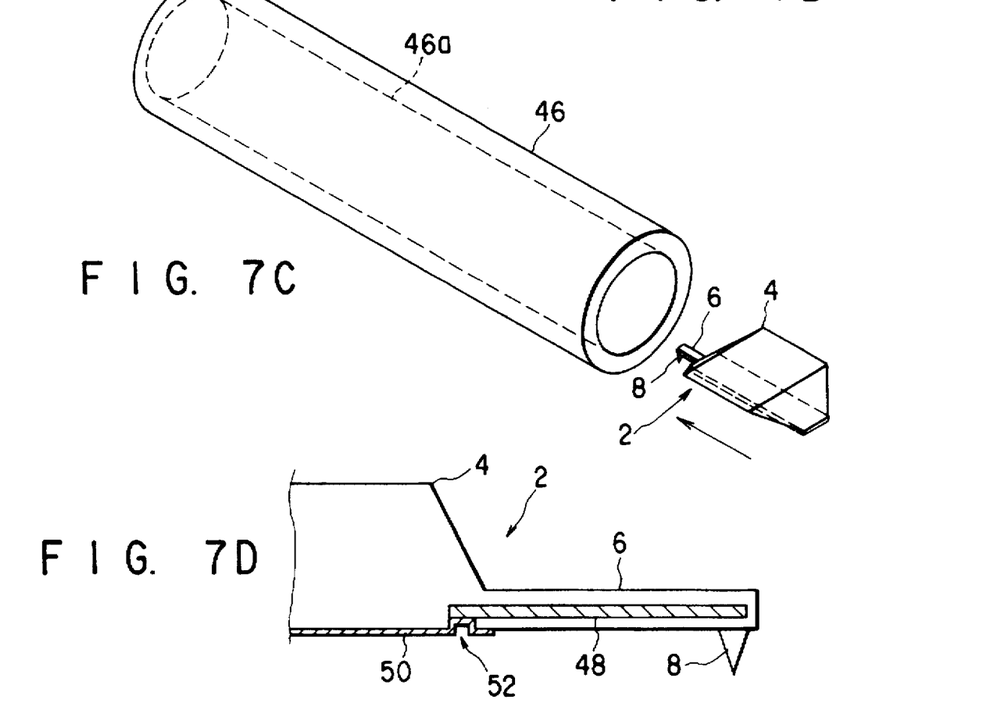
FIG. 7C is a perspective view showing the state in which SPM measurement of an inner wall surface of a deep portion of a cylindrical member such as a tube is performed.
FIG. 7D is a cross-sectional view showing a part of a cantilever chip provided with a piezoresistive layer.

In the above structure, when a strain occurs in the cantilever 6, the resistance value of the piezoresistive layer 48 varies and accordingly the value of current flowing in the electrode wire 44 varies. The amount of strain of the cantilever 6 is detected by measuring the varied current value.

FIG. 7A shows the state in which the cantilever chip 2 having the shape shown in FIGS. 3B and 3C is mounted on the base plate 42, and FIG. 7B shows the state in which the cantilever chip 2 having the shape shown in FIG. 1A is mounted on the base plate 42. According to the method of mounting, as shown in FIG. 7A, the length of electrode wire 44 to be bonded is made smallest, and the bonding step can be easily performed.

According to this embodiment, there is no need to provide an optical sensor (not shown), etc. for measuring a displacement of the cantilever 6. Thus, even if there is an object, etc. covering the upper side of the cantilever 6, the SPM measurement can be performed without influence of such an object, etc.

In FIG. 7C, the base plate 42 (see FIGS. 7A and 7B) is elongated so that SPM measurement can be performed on an inner wall surface 46a of a deep portion of a cylindrical member 46 such as a tube (FIG. 7C does not specifically the elongated substrate 42). In this example, the first and second inclined faces 10 and 12 are formed such that the width of the support section 4 of cantilever chip 2 decreases toward the inner wall surface 46a. Thus, even when the cylindrical inner wall surface 46a is SPM-measured by using the cantilever chip 2, only the tip portion of the probe 8 can be smoothly and exactly scanned over the inner wall surface 46a while the support face 4a is prevented from coming in contact with the cylindrical inner wall surface 46a.

In the present embodiment, the cantilever 6 is provided with the piezoresistive layer 48 utilizing the piezoresistive effect in order to measure the displacement of cantilever 6. The present invention, however, is not limited to this embodiment. For example, the cantilever 6 may be provided with a thin film (not shown) of lead zirconate titanate (PZT), zinc oxide (ZnO), etc. so that a displacement of cantilever 6 may be detected by making use of a piezoelectric effect of the thin film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A cantilever chip comprising:

a support section having a support face and an attachment face opposed to the support face;

a cantilever supported on the support face of the support section; and a probe provided on a free-end portion of the cantilever, wherein the width of the support face of the support section is less than the width of the attachment face such that a pointed end portion of the probe may scan a desired portion of a sample without influence due to the shape of a surface of the sample.

2. The cantilever chip according to claim 1, wherein the thickness of the support section between the support face and the attachment face decreases gradually away from the cantilever.

3. The cantilever chip according to claim 1, wherein said cantilever is provided with a strain sensor for detecting a strain of the cantilever due to an interactive force acting between said probe and the surface of the sample.

4. The cantilever chip according to claim 1, wherein said support section is formed of silicon, and a plurality of tapered faces having predetermined angles are formed between the support face and the attachment face.

5. The cantilever chip according to claim 4, wherein said plurality of tapered faces have (111) planes, respectively.

6. The cantilever chip according to claim 5, wherein each of said plurality of tapered faces is formed by means of anisotropic wet etching.

7. The cantilever chip according to claim 4, wherein said support face and said attachment face have (100) planes, respectively.

8. The cantilever chip according to claim 7, wherein each of said plurality of tapered faces is formed by means of anisotropic wet etching.

* * * * *